United States Patent

Hepp

[15] 3,689,845

[45] Sept. 5, 1972

[54] CIRCUIT ARRANGEMENT FOR SUPPRESSING INTERFERENCES IN A RECEIVER OF ELECTRICAL SIGNALS

[72] Inventor: Gerard Hepp, Eindhoven, Netherlands

[73] Assignee: U.S. Philips Corporation, New York, N.Y.

[22] Filed: Oct. 21, 1970

[21] Appl. No.: 82,637

[30] Foreign Application Priority Data

Nov. 1, 1969 Netherlands..............6916498

[52] U.S. Cl. ......................325/473, 325/65, 328/165

[51] Int. Cl. ...............................................H04b 1/10

[58] Field of Search......325/348, 473, 474, 475, 476, 325/478, 479, 480, 482, 65; 328/162, 163, 164, 165

[56] References Cited

UNITED STATES PATENTS

| | | | |
|---|---|---|---|
| 3,462,691 | 8/1969 | McDonald | 325/475 |
| 3,231,823 | 1/1966 | Garfield et al. | 325/473 |
| 3,588,705 | 6/1971 | Paine | 325/480 |
| 3,191,123 | 6/1965 | Eness et al. | 325/473 |
| 3,241,073 | 3/1966 | Hummel | 325/473 |

*Primary Examiner*—Robert L. Griffin
*Assistant Examiner*—Peter M. Pegori
*Attorney*—Frank R. Trifari

[57] ABSTRACT

A circuit arrangement for interference suppression in which the signal is applied through a gating circuit blocked during interference to a storage capacitor which maintains the signal level constant during interference. To reduce the distortion, pulses are added to the signal thus obtained, which pulses occur after releasing the gating circuit and whose amplitude is proportional to the signal step occurring as a result of the release in the output signal of the gating circuit.

6 Claims, 4 Drawing Figures

INVENTOR.
GERARD HEPP
BY
AGENT

*INVENTOR.*

GERARD HEPP

*BY* [signature]

AGENT

INVENTOR.
GERARD HEPP
BY
AGENT

CIRCUIT ARRANGEMENT FOR SUPPRESSING INTERFERENCES IN A RECEIVER OF ELECTRICAL SIGNALS

The invention relates to a circuit arrangement for suppressing interferences in a receiver of electrical signals, which circuit arrangement includes a signal detector and an interference detector. The output signal from the signal detector is applied through a gating circuit to a storage capacitor and the output signal from the interference detector controls a first pulse shaper whose output pulses block the gating circuit during the occurrence of an interference pulse Such a circuit arrangement is known from an Article in the magazine Alta Frequenza, vol. XXXVI, no. Aug. 8, 1967, pages 726–731 and has been described in greater detail in co-pending U.S. Patent application Ser. No. 82,611, filed on Oct. 21, 1970. As soon as an interference pulse appears in the received signal the gating circuit is blocked so that the interference pulse is prevented from reaching the output signal. It is achieved with the aid of the storage capacitor that instead of the interference pulse the output signal is maintained at a level which corresponds to the signal level just before the occurrence of the interference pulse.

Although an eminent suppression of interferences is obtained in this manner, it has been found that a noticeable distortion of the signal occurs in case of a large number of interferences. This is a result of the fact that a portion of the signal is cut off at every interference, namely a positive portion when the interference coincides with a positive going edge of the signal and a negative portion when the interference coincides with a negative going edge of the signal.

It is an object of the present invention to obviate this drawback and to this end the circuit arrangement according to the invention is characterized by a second pulse shaper which is started by the first pulse shaper as soon as the pulse from the first pulse shaper is finished a modulation means for varies the amplitude of the output pulses from the second pulse shaper proportionally to the potential change which occurs in the output voltage of the gating circuit when this gating circuit is released. A means combines the output voltage of the gating circuit and the output pulses from these modulation means.

The invention is based on the recognition of the fact that after a portion has been cut off from the signal as a result of an interference an equally large opposite portion is added to the signal again. The then residual error only includes components of comparatively high frequencies which are usually little noticeable, while the influence of suppressing the signal is completely eliminated in the comparatively low and well noticeable frequency components of the signal.

In order that the invention may be readily carried into effect, an embodiment thereof will now be described in detail, by way of example with reference to the accompanying diagrammatic drawings, in which.

Figure 1:
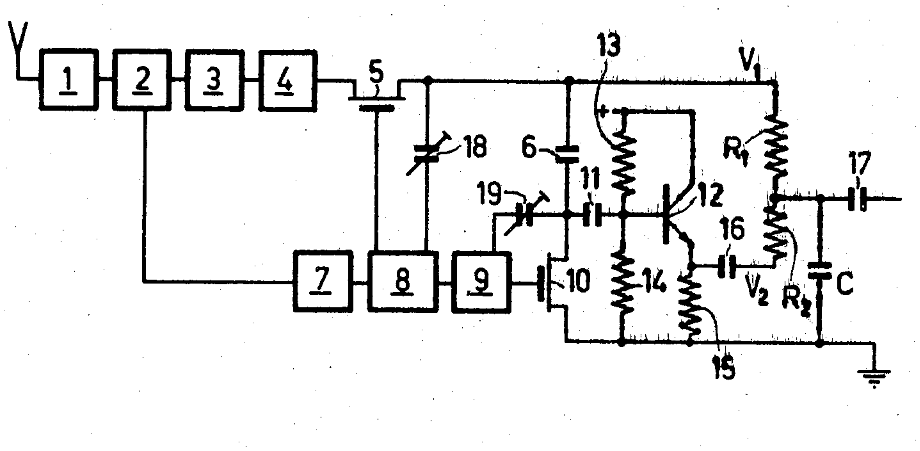
FIG. 1 shows an embodiment of a circuit arrangement according to the invention.

Fig. 1 shows a receiver including a tuning unit 1 connected to an aerial, an intermediate frequency amplifier 2 and a signal detector 3. These components may be of conventional construction. The signal from the signal detector 3 is subsequently applied through an emitter follower 4 to a MOS-field effect transistor 5 arranged as a gate transistor. A storage capacitor 6 is connected to the output electrode of this transistor and the output signal $V_1$ from the storage capacitor is applied through a resistor $R_1$ to a capacitor C serving for deemphasis.

An interference detector 7 which selects the interference pulses from the received signal is connected to the T.F. amplifier 2. The way in which interference pulses may be selected fro the signal does not form part of the present invention and this may be carried into effect, for example, in accordance with one of the methods described in said copending patent application.

The interference pulses selected by the interference detector 7 trigger a first pulse shaper 8 arranged as a monostable multivibrator. This monostable multivibrator has a time constant T (for example, 30 $\mu$ sec. ) so that a negative pulse having a duration of T (compare FIG. 2 curve II) is generated when an interference pulse appears. This negative pulse is applied to the gate electrode of field effect transistor 5 and cuts off this transistor so that the interference pulse which is present in the signal is prevented from being passed on.

The pulses from the pulse shaper 8 are also applied to a second pulse shaper 9 which is likewise arranged as a monostable multivibrator and which is triggered by the trailing edges of the pulses from the pulse shaper 8. The second pulse shaper has a time constant $\tau$ (for example, 3 $\mu$sec. ) so that this pulse shaper produces a negative pulse having a during of $\tau$ as soon as the pulse from the second pulse shaper is finished (compare FIG. 2, curve III). The pulses from the second pulse shaper are applied to the gate electrode of a second MOS-field effect transistor 10 arranged as a gate transistor and connected in series with the storage capacitor 6.

Figure 2:
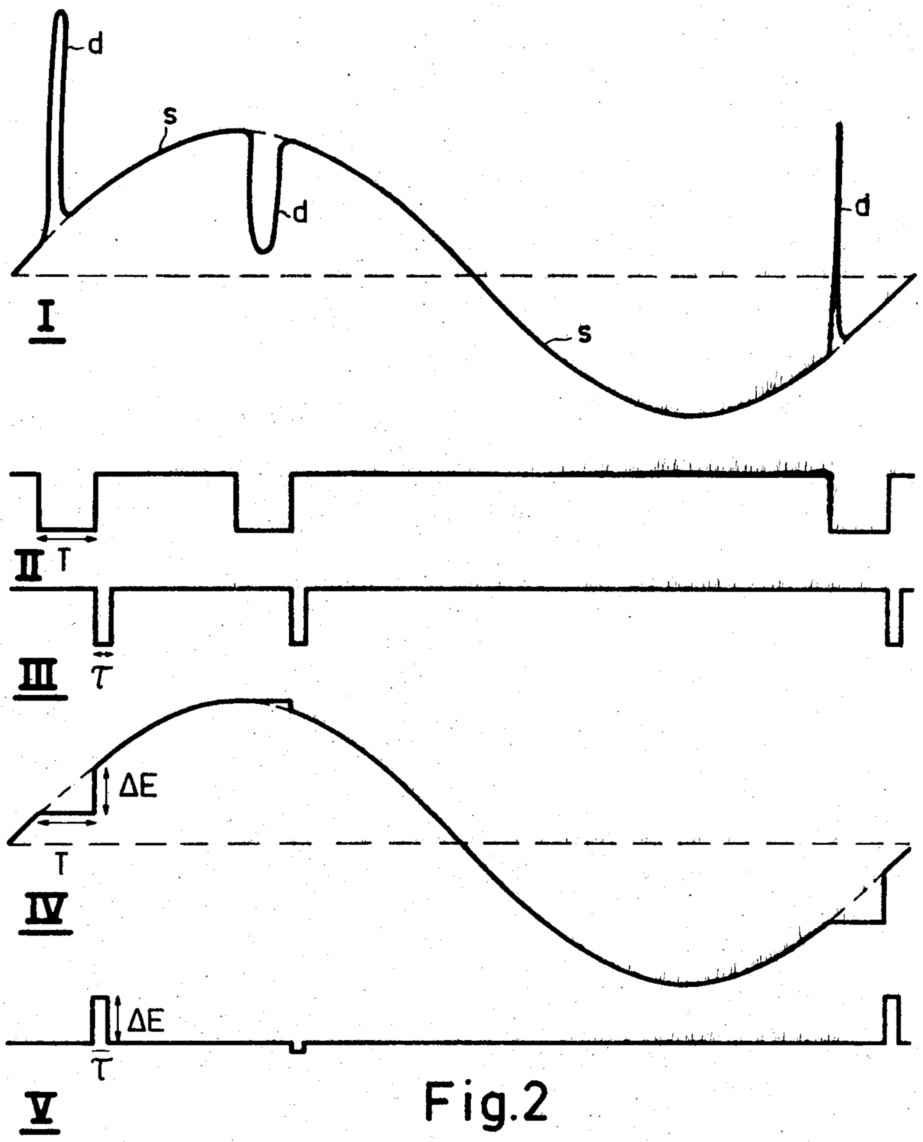
FIGS. 2 and 3 show a few voltage waveforms to explain the operation of the circuit arrangement of FIG. 1

To explain the operation of the circuit arrangement described so far, reference is made to the curves shown in FIG. 2.

Fig. 2, curve I shows a sinusoidal signal *s* including several interference pulses *d*. This signal appears at the input (supply) electrode of the field effect transistor 5. FIG. 2, curve II shows the output pulses from the first pulse shaper 8 which are applied to the gate electrode of transistor 5 and cut off this transistor during the occurrence of the interference pulses *d*. FIG. 2, curve III shows the output pulses from the second pulse shaper 9 which are applied to the gate electrode of transistor 10. This transistor normally conducts and is cut off by the pulses having a duration of $\tau$ . FIG. 2, curve IV shows the signal $V_1$ at the output (drain) electrode of transistor 5. As long as no interferences occur, this signal is equal to the signal at the input electrode of this transistor, because transistor 5 then conducts. However, as soon as an interference pulse occurs and consequently transistor 5 is cut off, the signal at the output electrode of this transistor is retained at the value which it had just before the occurrence of the interference. This is due to the storage capacitor 6 which is connected to this electrode and which is grounded through the conducting transistor 10.

A voltage step Δ E occurs at the output electrode of transistor 5 at the end of the cut off period T of this transistor, which step is equal to the difference in signal voltage after and before this cut off period. However, at the same instant the gate transistor 10 is cut off so that the charge of and hence the voltage across storage capacitor 6 remains constant. This means that the voltage step Δ E which occurs on the upper side of the storage capacitor 6 is also present on its lower side. After termination of the cut off period $\tau$ of transistor 10, the lower side of storage capacitor 6 is connected to ground potential again. Thus, pulses having an amplitude Δ E and a duration $\tau$ are available on this lower side. (compare FIG. 2, curve V).

These pulses are applied through a coupling capacitor 11 to the base electrode of a transistor 12 arranged as an emitter follower and including base-potential divider 13–14 and emitter resistor 15. The output pulses from this emitter follower are applied through a further coupling capacitor 16 and a resistor $R_2$ to the deemphasis capacitor C. The signal occurring across the capacitor is derived via a coupling capacitor 17.

Figure 3:
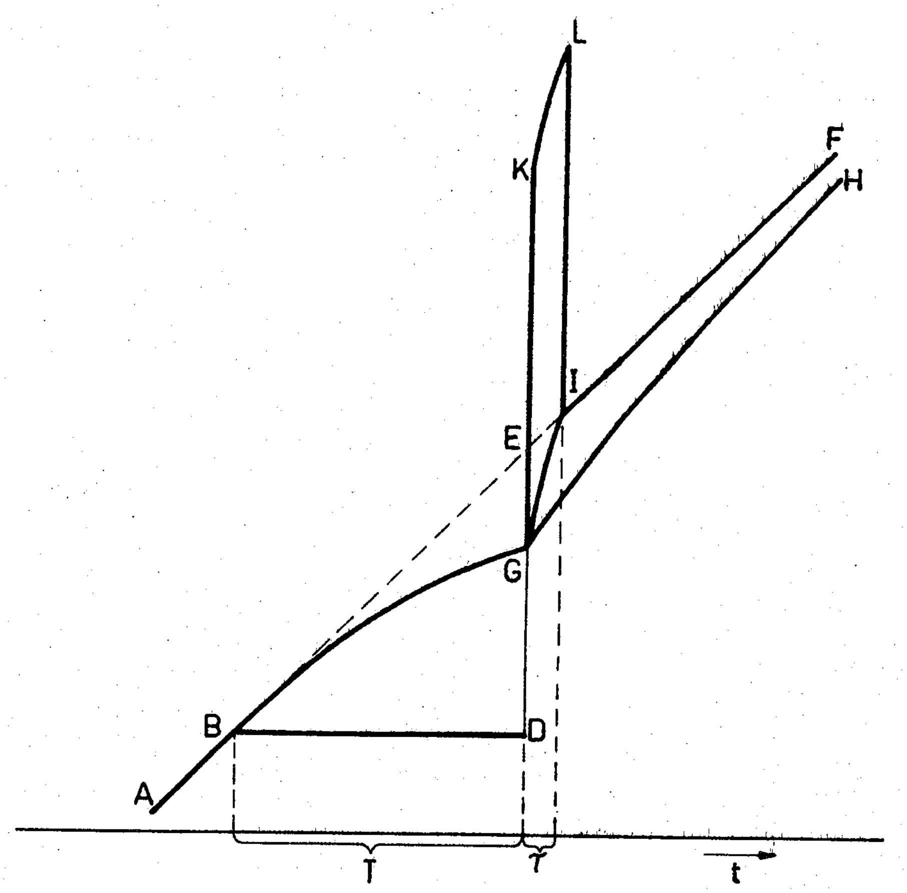

To explain the operation of the circuit arrangement more fully, FIG. 3 shows the compensation process in greater detail.

Let it be assumed that the desired signal varies in accordance with the straight curve ABEIF. During the occurrence of interference the output voltage $V_1$ of the gate transistor 5 varies in accordance with ABDEF. When this signal is applied without further compensation steps to the deemphasis capacitor C through the resistor $R_1$, the voltage across this capacitor will have the variation shown in FIG. 3 by the curve ABGH. It can be seen clearly that the deemphasis causes a long dying out phenomenon (the difference between the curves EF and GH) which phenomenon has a highly disturbing effect.

As has been described the compensation voltage $V_2$ comprising pulses having a duration of $\tau$ and an amplitude which is proportional to the voltage step Δ E in t the signal $V_1$ is applied through the resistor $R_2$ to the deemphasis capacitor C. As a result the shortage of charge of this capacitor is completed during the period $\tau$. By suitable choice of the resistor $R_2$ the charge of the capacitor is modified exactly to such an extent that the voltage across this capacitor is equal to the desired signal voltage at the end of the period $\tau$ . The capacitor voltage than varies in accordance with the curve ABGIF and the above-mentioned dying out phenomenon is completely avoided.

Since the compensation pulses $V_2$ have been made proportional to the voltage step Δ E in the signal voltage $V_1$and since this voltage step is proportional to the slope of the desired signal, the described compensation is obtained for all slopes of the desired signal. It may be proved that if the amplitude of the compensation pulses is B Δ E, the correct compensation is obtained at:

$$\frac{R_1}{R_2}=\frac{T/_{\tau d}+e^{--1/\tau}d_{-1}}{BT/_{\tau d}(e^{\tau/\tau}d-1)}$$

in which $T$ is the suppression period of transistor 5
$\tau$ is the suppression period of transistor 10.
and $\tau_d$ is the deemphasis time constant=

$$C\frac{R_1-R_2}{R_1+R_2}$$

Values which yield a satisfactory result in practice are, for example, $T=30\ \mu$sec.
$\tau=3\ \mu$sec.
$\tau_d=50\ \mu$sec.
$B=1$.

Figure 4:
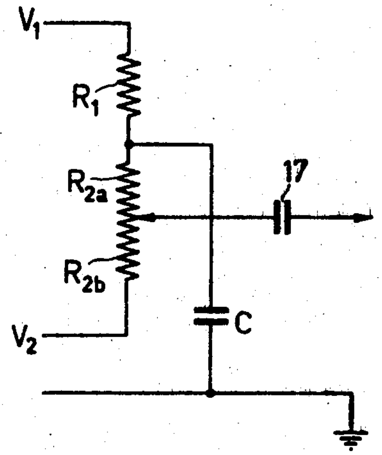
FIG. 4 shows a modified detail of the circuit arrangement of FIG. 1.

It follows from the above-mentioned equation for these values that $R_1 = 4R_2$. As is apparent from FIG. 3 it is true that the long dying out phenomenon is prevented by the compensation described, but there is still a surface difference between the signal variation ABGIF then obtained and the desired signal variation ABEIF. This difference, which gives rise to some noticeable interference in the reproduced signal, may be compensated in a simple manner by deriving the output voltage from a tap on $R_2$ instead of from the deemphasis capacitor (compare the detailed circuit diagram of FIG. 4). Due to this step an additional compensation pulse is added to the output signal so that a surface is added to the signal while the absence of a dying out phenomenon is maintained. The output signal then varies in accordance with the curve ABGKLIF of FIG. 3. By suitable choice of the tap on the resistor $R_2$ it may be achieved that the shortage of surface in the voltage variation ABGIF is compensated by a pulse GKLI of the same surface. The then residual error only includes components of comparatively high frequencies which are hardly noticeable.

The correct position of the tap on resistor $R_2$ may be found with the aid of the equation:

$$\frac{R_{2b}}{R_1+R_{2a}}=\frac{2B\tau}{T}$$

wherein $R_{2a}$ represents the portion of $R_2$ above the tap and $R_{2b}$ represents the portion below the tap. It follows from the above-mentioned numerical Example that $$\frac{R_{2b}}{R_1+R_{2a}}=0.2$$

Both equations are satisfied, for example, with $R_1 = 24$ Kohms. $R_{2a} = 1$ Kohm and $R_{2b} = 5$ Kohms. For the deemphasis capacitor it is then found with the aid of $$\tau d=C\frac{R_1R_2}{R_1+R_2}\ \text{that: } \tau_d\approx 10nF$$

It is to be noted that the coupling capacitors 11 and 16 and the base potential divider 13–14 may be omitted. For the purpose of the DC adjustment of transistor 12, the emitter resistor 15 is then to be connected to a supply voltage which is negative relative to ground potential, or the source electrode of transistor 10 is to be connected to a positive direct voltage. The base direct current of transistor 12 then flows through the normally conducting gate transistor 10.

Pulses which are in phase opposition with the pulses applied to the gate electrode of transistor 5 are derived from the pulse shaper 8 and are applied through a preferably adjustable capacitor 18 of low value to the drain electrode of transistor 5. In this way a compensation is obtained for the pulses which reach the drain electrode through the inter-electrode capacitance between the gate and drain electrodes of transistor 5. In a corresponding manner an adjustable capacitor 19 of low value between the second pulse shaper 9 and the drain electrode of transistor 10 serves for neutralizing the inter-electrode capacitance between gate and drain electrodes of transistor 10.

What is claimed is:

1. A circuit for eliminating noise from a composite signal containing information and noise component signals, said circuit comprising means coupled to receive said composite signal for detecting said noise signal; a first pulse shaper means coupled to said noise detecting means for supplying gating pulses during the occurrance of said noise signals; a gate having an input coupled to receive said composite signal, a control input coupled to receive said gating pulses, and an output means; a storage capacitor coupled to said output means, the voltage across said capacitor being said information signal with voltage steps at the termination of said gating pulses; a second pulse shaper means coupled to said first shaper for supplying output pulses respectively starting at the termination of said gating pulses; means having inputs coupled to said second shaper and said storage capacator respectively for modulating the amplitude of said second shaper output pulses proportional to said respective voltage steps; and means for combining said information signal having voltage steps and said modulation means output pulses to produce an output signal, whereby the distortion of said information signal due to said voltage steps is substantially eliminated in said combining means output signal.

2. A circuit as claimed in claim 1 wherein said modulating means comprises a second gate circuit having an input coupled in series with said storage capacitor, a control input coupled to said second pulse shaper, and an output coupled to said combining means.

3. A circuit as claimed in claim 1 wherein said combining means comprises a first impedance means coupled to said first gate output, a second impedance means coupled to said modulator, and a deemphasis capacitor coupled to both of said impedance means.

4. A circuit as claimed in claim 3 wherein each of said impedance means has a value such as to substantially eliminate transient effects in the output signal of said combining means after the duration of said second pulse shaper output pulses,

5. A circuit as claimed in claim 3 wherein said first and second impedance means comprise a matrix circuit means for reducing errors in said combining means output signal.

6. A circuit as claimed in claim 5 wherein said second impedance means has a tap coupled to said deemphasis capacitor.

* * * * *